Patented May 15, 1945

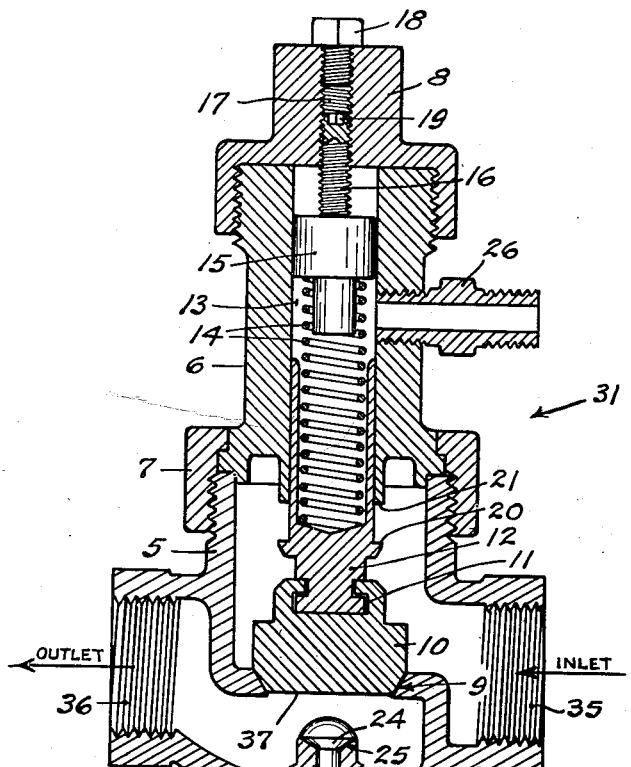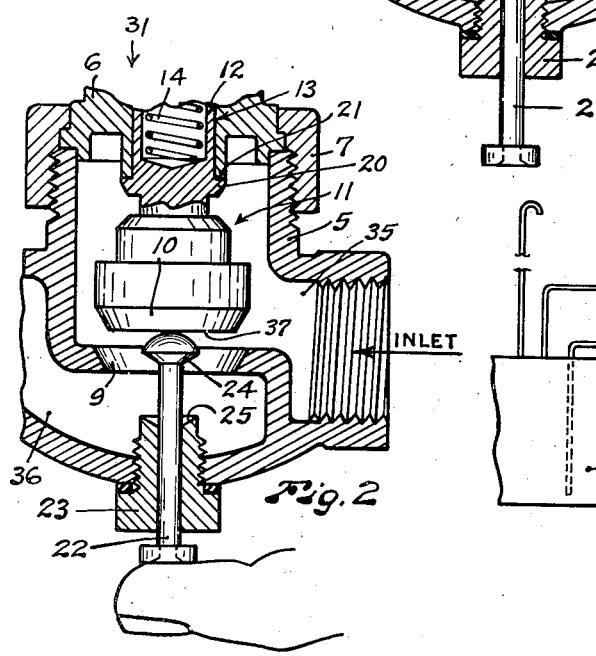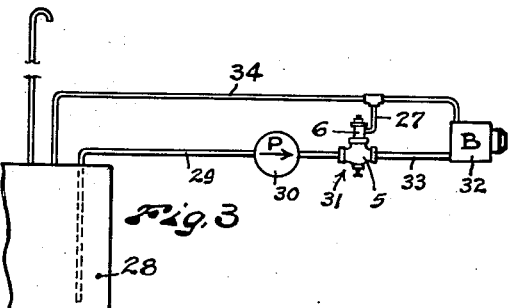

2,375,810

UNITED STATES PATENT OFFICE 2,375,810

CUTOFF VALVE

Christian A. Nelson, Bellevue, Wash.

Application September 7, 1943, Serial No. 501,459

2 Claims. (Cl. 137—153)

This invention relates to a cut-off valve.

An object of this invention is to provide a valve means which may be opened only manually and which after being opened manually will remain open only so long as a minimum predetermined pressure obtains in the fluid passing therethrough.

A further object of this invention is to provide valve means normally assuming a closed position, which after being manually opened, will automatically close upon a drop below a predetermined minimum in the fluid pressure of fluids passing therethrough and will remain closed irrespective of fluid pressure changes occurring after the valve has closed.

It is a further object of this invention to provide an adjusting means determining the minimum fluid pressure to maintain the valve means in open position.

Another object of this invention is to provide a valve means that will be responsive to an increase of pressure in a return or by-pass conduit so that said valve means will be closed and remain closed, until manually reset, in the event of increase of pressure over a predetermined maximum in the return line or by-pass conduit.

Another object of this invention is to provide a valve means having self-sealing features between moving parts thereby precluding leakage from said valve when fluid is flowing therethrough.

Another object of this invention is to provide valve means which are not only held open by the pressure of fluid flowing through the valve but which utilizes the pressure of the fluid flowing through the valve to aid in promptly and positively closing the valve in the event that the pressure of the fluid flowing through the valve falls below a predetermined minimum pressure. This prompt and positive action of the valve member in moving from open position to closed position prevents fluttering or indecisive action of the valve means and insures positive operation of the valve means in the event that the pressure of the fluid flowing through the valve decreases below a predetermined fixed minimum pressure.

Another object of this invention is to provide a manually operable stem extending through a wall of the valve housing by which the valve may be manually moved from a closed to an open position, said stem being self-sealing when in normal position so as to preclude leakage around the stem without necessitating the use of packing glands around said stem.

Another object of this invention is to provide a valve means that is wholly mechanically operable, as distinguished from electrical, and which may be used in connection with the oil lines of an oil burner to cut off the flow of fuel in case of dangerous conditions arising in the operation of the oil burner.

In the operation of oil burners of the type which do not provide for automatic ignition, a dangerous condition will obtain if the pressure in the fuel supply line drops below the amount necessary to maintain the burner flame. If the fuel supply drops below the amount that is necessary to maintain the burner flame and then if the oil flows, either at reduced pressure or at a normal pressure, this fuel entering a highly heated combustion chamber may be gassified causing explosive conditions.

It is an object of this invention to provide a valve means having particular utility in the fuel oil supply line of an oil burner, which after being manually set in an open position will be held open by the normal pressure of the oil in the oil supply line as long as the pressure remains above a predetermined minimum but will be automatically closed instantaneously in the event that the pressure in the oil supply line drops below a predetermined minimum, thus shutting off the feed of oil to the burner and maintaining such feed shut-off until the valve means is manually reset. Thus in the event that the pressure in the oil supply line drops too low to sustain combustion, the oil burner automatically becomes inoperative and thus an operator can provide flame in the firebox before the valve means is manually reset to permit flow of oil to the firebox. Thus I prevent the flow of oil into a hot firebox having no flame therein and thus eliminate explosive conditions.

Also in the operation of oil burners, explosions are apt to occur if the pressure in the oil return or overflow conduit, sometimes called the by-pass line, becomes too high. My valve means overcomes this difficulty by shutting off the feed of the oil to the burner in the event that the oil pressure in the return conduit rises above a predetermined safe maximum.

The above mentioned general objects of my invention, together with others inherent in the same, are attained by the mechanism illustrated in the following drawing, the same being a preferred exemplary embodiment of my invention, throughout which drawing like reference numerals indicate like parts:

Figure 1 is a longitudinal sectional view of a valve constructed in accordance with my invention showing the valve member in closed position;

Fig. 2 is a fragmentary sectional view of said valve showing the valve member being held in an open position by a manually operable valve opening or valve resetting device; and Fig. 3 is a diagrammatic view in elevation showing my valve installed in an oil supply line and oil return line of an oil burner.

Referring more particularly to my valve means as shown in Fig. 1 of the drawing, a valve housing comprises a main body portion 5 and a tubular bonnet or neck portion 6 secured together by an internally threaded bonnet ring 7. The tubular neck portion 6 is provided with a cap member 8 that is threaded thereon.

The main body portion 5 is provided with a valve seat 9 for the reception of a movable valve member 10 that controls the flow of fluid through the valve in the direction of the arrows in Fig. 1. The valve member 10 is secured by loosely fitting joint means 11 to a stem 12 that is slidably disposed in the bore 13 of the tubular neck 6. The loosely fitting joint means 11 connects the valve member 10 loosely and floatingly with the stem 12 and allows enough lost motion between the valve member 10 and stem 12 to insure that the valve will always seat properly on the seat 9.

The stem 12 is of tubular construction to provide an external sliding fit with bore 13 and to internally receive and maintain alignment of a compression spring 14. The spring 14 yieldingly urges the valve 10 toward the closed position in which it is shown in Fig. 1. One end portion of the spring 14 bears against an adjustable support 15 of cylindrical shape that is adjustably disposed in the bore 13 of the neck member 6.

An adjusting screw 16 is operable in a threaded bore 17 in the cap 8 and the adjustable spring support 15 bears against the inner end portion of this adjusting screw 16. The threaded bore 17 is of sufficient length so that the outer end of the adjusting screw 16 will always be well within said bore and a cap screw 18 is threaded into the outer end portion of the threaded bore 17 to seal said bore 17. The adjusting screw 16 is turned by removing the cap screw 18 and inserting into the threaded bore 17 a tool that is properly shaped to engage within a recess 19 in the outer end of said adjusting screw 16.

The tubular stem 12 is provided, adjacent the valve 10, with an external annular flange 20. The flange 20 has two functions, first as a valve to seat upon a seat member 21 that is formed on the inner end portion of the neck member 6.

When the valve member 10 is in open position, as shown in Fig. 2, the flange like valve member 20 will be seated on the seat 21 by the pressure of fluid passing through the valve and the valve will be sealed against the escape of fluid under pressure between the stem 12 and bore 13. When fluid under pressure is delivered to the valve means, the normal operative condition of the valve means is that the same is in open position so I provide a sealing means operative during normal periods.

The second function of the flange like valve member 20 is to insure a quick and positive movement of the valve 10 from open to closed position for the following reasons. When the valve 10 is in the fully open position as shown in Fig. 2, the upper face of member 20 is seated on the seat 21 and the fluid pressure which is holding the valve 10 open cannot act on this upper face of member 20. As soon as the valve 10 begins to move toward a closed position, the upper surface portion of flange 20 is exposed to and the fluid pressure is allowed to react against said upper face of the member 20 and the balance of forces is thus changed in such a manner as to close the valve 10 with a quick and decisive movement and without any hesitancy or fluttering of the valve 10. More specifically the valve 10 is first moved manually as indicated in Fig. 2 to the position shown in Fig. 2. The tension of spring 14 has been adjusted by screw 16, so that when the valve 10 is open, it will remain open because of a predetermined fluid pressure on the lower surface of the valve 10 which will counteract the pressure of spring 14. However, when the fluid pressure of the fluid passing through the valve drops below the predetermined setting of the spring pressure of spring 14, then the spring 14 will cause stem 12 to travel toward closed position of the valve 10 and the upper surface of flange 20 will be exposed to and acted upon by fluid passing through the valve and this will augment the closing of valve 10.

Manually operated means are provided for moving the valve 10 from closed to open position. This means comprises a rod or pin 22 that is slidably supported for longitudinal movement in a bushing 23. The bushing 23 is preferably threaded into the valve body 5. A valve member 24 is provided on the rod or pin 22 and the same may seat on a seat 25 carried by the upper surface of bushing 23. Thus after rod 22 is manually moved upwardly as shown in Fig. 2, the fluid under pressure will pass below valve 10 and maintain the same in open position and when the rod 22 is retracted to the position shown in Fig. 1, the fluid under pressure will act on the upper surface of valve 24 and urge the said valve into sealing relation with its seat 25. As the normal operative condition of the valve means obtains when fluid under pressure is passing therethrough, i. e., the valve is in open position, rod 22 is down, and valve 24 seats on seat 25 (as shown in Fig. 1), I provide sealing means for rod 22 operable during normal periods and without the use of packing means on the rod.

Threaded bushing 26 threadedly engages neck portion 6 and communicates the fluid under pressure in the return or by-pass conduit 27 with the upper portion of bore 13 and thence against the face on the lower portion of stem 12. Upon increase of pressure of the fluid in conduit 27 and in turn bore 13 over a predetermined maximum pressure, the balance of pressures will be upset and the fluid under pressure in the bore 13 will cause the stem 12 and valve 10 connected therewith to travel downwardly and thus seat the valve 10 on its seat 9 thus closing the valve means. Of course once stem 12 moves enough to expose flange 20 to fluid pressure, this pressure as well as the pressure of spring 14 will assist in closing the valve 10.

Referring more particularly to Fig. 3 of the drawing, 28 illustrates a source of supply, as a tank of fuel oil. 29 is the feed line, 30 is the pressure providing means as a pump and 31 illustrates generally my valve means shown in detail in Figs. 1 and 2 of the drawing. The outlet of my valve means 31 connects with a burner 32 by means of conduit 33. The by-pass conduit 34 connects between burner 32 and tank or source of fuel oil 28 and conduit 27 is tapped into the by-pass conduit 34 so that the pressure of fluid in said return or by-pass conduit 34 is communicated to bore 13 as previously explained. It is common practice on oil burners to provide a by-pass or oil return so that if the burner is adjusted to deliver less oil than is being delivered to it, the excess oil returns by the by-pass or overflow conduit to the tank. However, if the by-pass conduit 34 becomes stopped or plugged so there is an abnormal pressure or pressure over a predetermined maximum in the by-pass line, then this will be reflected in the operation of the burner and more oil will be delivered to the burner than is required. Thus when my valve means is adjusted so that it will remain in open position with normal pressure in the return line being communicated to the bore 13 where it will act upon the stem 12, I provide a second safety feature so that in the event of excessive pressure in the return or by-pass conduit 34 my valve means will be moved to closed position. Thus if the valve means moves to closed position because of excess pressure in by-pass conduit 34 the valve means 10 will close and until the trouble is corrected in the by-pass conduit 34 my valve means will remain closed. In the event that it is desired not to use the feature of my invention relating to additional control of the valve means by the pressure in the by-pass conduit, then the bushing 26 will serve as an air vent means. This is preferable as it eliminates any likelihood of compressed air in the bore 13 and thus provides for greater nicety of adjustment.

In oil burner installations where a minimum cost is desired and also in oil burner installations where a minimum of electrical equipment is desirable for certainty of operation, such as aboard naval craft, automatic ignition is not employed. Further where the heavier oils are being burned, automatic ignition is not always positive and certain. In such instances it is the practice to provide flame in the firebox from an inflammable material, such as paper, and then to deliver oil from the burner into a firebox in which flame is present. After the burner has been operating and the firebox assumes a very highly heated condition, then if the fuel supply from the burner drops below the supply necessary to maintain flame in the firebox or if the fuel supply from the burner is momentarily interrupted so that the fire is extinguished, then heretofore we have a condition of delivering oil against highly heated surfaces and a condition obtains where the oil will gassify causing explosive conditions. In the event that the pressure in the fuel supply line drops momentarily or continuously below a safe minimum operating pressure, then explosive conditions obtain so rapidly that it is normally impossible for the operators to operate a valve turning off the fuel oil supply and in actual practice it has been found that explosions, because of the before mentioned conditions are not uncommon. With the use of my valve means any drop in pressure in the fuel supply line below a predetermined safe minimum will result in the valve means closing the fuel supply means and in a rapid and prompt fashion. Thus the operator may provide flame in the firebox and thereafter fuel may be again delivered into the firebox and delivered under safe conditions. Of course if mechanical difficulties have brought about the abnormal low pressure in the feed supply line these will be first corrected before operation of the oil burner. Likewise in the event of abnormal high pressure in the by-pass line, my valve means provides for interrupting the feed in the feed supply line and the defective condition causing such abnormal high pressures in the by-pass line will be corrected before further operation of the oil burner.

By way of summary, the main body portion 5 and the neck portion 6 provide housing means having inlet chamber means 35 and outlet chamber means 36 therein. The valve seat means 9 is disposed between said inlet chamber 35 and said outlet chamber 36. The valve 10 is positioned within the inlet chamber 35 and is movable toward and away from the seat 9 and thus closes and opens the inlet chamber means from said outlet chamber means—the closed position being shown in Fig. 1 of the drawing and the open position being shown in Fig. 2 of the drawing. When the valve 10 is in the open position shown in Fig. 2 of the drawing, the means providing a closing pressure tending to urge the valve 10 into the closed position shown in Fig. 1 comprise a number of factors. First, the resilient adjusted pressure of the spring 14 tends to urge the valve 10 into closed position. Also if the the valve is operated in the upright position as indicated in the drawing, the weight of the valve 10 and parts connected therewith also tend to urge the valve 10 into closed position. Also, any horizontal surface portions on the upper portions of valve 10 and parts connected therewith are exposed to the fluid pressure of the fluid in the inlet chamber 35 and thereby a pressure is exerted tending to close the valve 10 on its seat 9. After the valve 10 has been mechanically reset or moved to open position as indicated in Fig. 2 of the drawing, the under surface 37 is exposed to the fluid pressure of fluid passing through the valve, that is, from the inlet 35 and out the outlet 36. The surface area of the portion 37 is sufficient so that once the valve 10 has been mechanically moved by rod 22 and parts connected therewith to open position, then sufficient pressure obtains from the fluid passing through the valve to maintain the valve 10 in an open position so long as a predetermined minimum pressure obtains in said fluid. n view of the fact that the portion 37 is within the outlet chamber 36 when the valve means are closed, then once the valve 10 closes the incoming pressure or the fluid within the inlet chamber 35 cannot open the valve means. Thus the portion 37 constitutes a surface portion on the valve 10 which is exposed to fluid under pressure only when the valve 10 is in open position and the pressure obtained from the fluid in inlet chamber 35 against the surface portion 37 is sufficient to counteract the previously mentioned pressures tending to urge the valve in closed position so long as fluid flows through the valve at a pressure above the predetermined set minimum pressure. Also in view of the position of the surface 37 it is necessary to mechanically open the valve 10, after the same has closed, before the pressure from the inlet chamber 35 may act upon the surface 37.

The adjusting means to determine the minimum pressure which is necessary to maintain the valve 10 in open position, after the same has been mechanically opened, constitutes the adjusting screw 16 and parts connected therewith.

In order to utilize the pressure of the fluid in the inlet chamber 35 to maintain the valve 10 seated once the same has moved on its seat, horizontal portions are provided on the upper portions of valve 10 to provide a relatively greater area to valve 10 than stem 12. When the valve 10 is closed the upper portion of the valve 10 will provide a closing and not counteracted pressure. However, a differential in area over the said upper surface of valve 10 is provided in the surface 37 to provide sufficient pressure to counteract the downward pressures and maintain the valve 10 open, once it has been mechanically opened, and a predetermined minimum pressure in the fluid continues. In other words, if it is desired to eliminate the function of employing the fluid under pressure in the inlet chamber 35 to maintain the valve 10 on its seat then the stem 12 and the valve 10 would have the same diameter.

In order to augment the closing action of valve 10 when the fluid pressure acting on the surface 37 falls below a minimum predetermined level, I provide a flange 20 on the stem 12. The flange 20 seats against seat 21 when the valve 10 is in fully opened position and therefore the horizontal surface portions of flange 20 are not exposed to the action of the fluid under pressure in the inlet chamber 35 when the valve 10 is in fully opened position. However, any movement of the valve 10 toward closed position will expose the horizontal portions of the flange 20 to the fluid pressure in the inlet chamber 35 and thus additional closing pressure obtains once the valve 10 starts to close and thus provision is made for positive and substantially instantaneous closing movement of the valve 10 once the same starts to close.

Also, when the valve 10 is in its normal operating position which will be in open position, then the flange 20 seats against the seat 21 and thus provision is made to eliminate any leakage of fluid under pressure out alongside of the stem 12. Also, the stem or rod 22 which is used to manually reset or open valve 10 is provided with a valve 24 and seat 25 on bushing 23 so that when the valve 22 is in the retracted position shown in Fig. 1 of the drawing, provision is made to utilize the pressure in the outlet chamber 36 to seal the rod 22 from leakage.

The bushing 26 functions both as an air relief means and as a conduit connecting a fluid pressure from a separate source to the chamber above the stem 12 and thus when the fluid pressure in the return or by-pass conduit 34 exceeds a predetermined maximum pressure then my valve means will operate to close inlet chamber 35 from outlet chamber 36.

Obviously, changes may be made in the forms, dimensions, and arrangement of the parts of my invention, without departing from the principle thereof, the above setting forth only a preferred form of embodiment.

I claim:

1. In valve means, a housing having inlet chamber means and outlet chamber means therein; valve seat means disposed between said inlet and outlet chamber means; a fluid pressure chamber connected to a separate source of fluid pressure; a piston slidable in said chamber and movable in one direction in response to increase in fluid pressure; a valve connected with said piston and positioned in the inlet chamber means and movable toward and away from said seat means and closing and opening said inlet from said outlet chamber means; a surface portion on said valve exposed to fluid under pressure only when the valve is in open position and counteracting said closing pressures and maintaining said valve in open position, after being moved to such position, by the pressure of fluid passing through the valve means; and means operable to move said valve to open position.

2. In valve means, a housing having inlet chamber means and outlet chamber means therein; main valve seat means disposed between said inlet and outlet chamber means; cylinder means connected with said inlet chamber and having seat means on the end portion within said inlet chamber; a piston slidable in said cylinder and having valve means thereon seating on said seat means when the piston is retracted; a main valve carried by said piston and positioned in the inlet chamber means and movable toward and away from said main valve seat means and closing and opening said inlet from said outlet chamber means; means urging the main valve toward closed position; a surface portion on said main valve exposed to fluid pressure only when the valve is in open position and counteracting said means urging the valve toward closed position and maintaining said valve in open position, after being moved to such position, by the pressure of fluid passing through the valve means; and means operable to move said valve to open position.

CHRISTIAN A. NELSON.